(12) United States Patent
Takeda et al.

(10) Patent No.: US 8,047,571 B2
(45) Date of Patent: Nov. 1, 2011

(54) FIXTURE STRUCTURE FOR IN-VEHICLE ELECTRONIC APPARATUS

(75) Inventors: Teruaki Takeda, Saitama (JP); Shoichi Yoshizawa, Saitama (JP); Kazumi Oosawa, Saitama (JP); Takeyoshi Katou, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 292 days.

(21) Appl. No.: 12/310,554

(22) PCT Filed: Dec. 18, 2007

(86) PCT No.: PCT/JP2007/074277
§ 371 (c)(1),
(2), (4) Date: Feb. 27, 2009

(87) PCT Pub. No.: WO2008/078597
PCT Pub. Date: Jul. 3, 2008

(65) Prior Publication Data
US 2010/0187272 A1  Jul. 29, 2010

(30) Foreign Application Priority Data
Dec. 27, 2006  (JP) .................................. 2006-352220

(51) Int. Cl.
*B60R 21/02* (2006.01)

(52) U.S. Cl. .............................. 280/748; 180/90; 296/70

(58) Field of Classification Search .................. 280/748, 280/752; 180/90; 296/70
See application file for complete search history.

(56) References Cited

U.S. PATENT DOCUMENTS

| 3,806,154 | A | * | 4/1974 | Akiyama ....................... 280/752 |
| 5,482,319 | A | | 1/1996 | Yoshimura et al. |
| 5,518,270 | A | | 5/1996 | Hanada et al. |
| 5,951,045 | A | | 9/1999 | Almefelt et al. |
| 2004/0041385 | A1 | | 3/2004 | Garnweidner et al. |

FOREIGN PATENT DOCUMENTS

| EP | 1 398 222 | 3/2004 |
| JP | 58-33722 | 7/1983 |
| JP | 59-151490 | 10/1984 |

(Continued)

OTHER PUBLICATIONS

International Search Report mailed Jan. 29, 2008 in the International (PCT) Application of which the present application is the U.S. National Stage.

(Continued)

*Primary Examiner* — Eric Culbreth
(74) *Attorney, Agent, or Firm* — Wenderoth, Lind & Ponack, L.L.P.

(57) ABSTRACT

A fixture structure for an in-vehicle electronic apparatus includes an in-vehicle electronic apparatus fixture bracket through which an in-vehicle electronic apparatus is attached to a vehicle body. The in-vehicle electronic apparatus fixture bracket includes a retreat structure part allowing the in-vehicle electronic apparatus to retreat toward the front of the vehicle body when a dynamic load is inputted into the in-vehicle electronic apparatus. The retreat structure part includes: a hinge part allowing a lower portion of the in-vehicle electronic apparatus fixture bracket to rotate together with the in-vehicle electronic apparatus, toward the front of the vehicle body about an upper portion of the in-vehicle electronic apparatus fixture bracket; and a rotational displacement accepting part allowing the lower portion of the in-vehicle electronic apparatus fixture bracket to be displaced due to its own rotation toward the front of the vehicle body.

5 Claims, 12 Drawing Sheets

FOREIGN PATENT DOCUMENTS

| | | |
|---|---|---|
| JP | 4-80739 | 7/1992 |
| JP | 09-048292 | 2/1997 |
| JP | 09-109786 | 4/1997 |
| JP | 2006-341776 | 12/2006 |

OTHER PUBLICATIONS

Partial English translation for JP Publication No. S59-151490, published Oct. 11, 1984.

Partial English translation for JP Publication No. H4-80739, published Jul. 14, 1992.

Partial English translation for JP Publication No. S54-122059, published Aug. 27, 1979.

Supplementary European Search Report dated Aug. 3, 2010 in European Application No. 07 85 0765 corresponding to the present U.S. application.

* cited by examiner

FIXTURE STRUCTURE FOR IN-VEHICLE ELECTRONIC APPARATUS

TECHNICAL FIELD

The present invention relates to a fixture structure for an in-vehicle electronic apparatus.

BACKGROUND ART

Vehicles such as automobiles are each provided with an instrument panel in a front portion of the vehicle compartment. This instrument panel includes a center equipment placement section or the like provided in a center portion thereof in the vehicle width direction.

An in-vehicle electronic apparatus such as an audio unit and other types of apparatuses are set in this center equipment placement section.

The in-vehicle electronic apparatus of this kind is attached to the vehicle body by use of in-vehicle electronic apparatus fixture brackets.

Each in-vehicle electronic apparatus fixture bracket includes a retreat structure part for allowing the in-vehicle electronic apparatus to retreat almost toward the front of the vehicle body (for reference, see Japanese Patent Application Publication No. Hei. 9-48292).

To put it in detail, the retreat structure part described in Japanese Patent Application Publication No. Hei. 9-48292 is so configured that: fixture holes are provided in each in-vehicle electronic apparatus fixture bracket to have an in-vehicle electronic apparatus inserted therein, and are each formed into an elongated hole having a neck part therein. When the in-vehicle electronic apparatus is inserted into the elongated holes with pressure (in other words, when a dynamic load is inputted), attachment screws go over the respective neck parts. Thus only the in-vehicle electronic apparatus is allowed to move forward and diagonally downward along the elongated holes in parallel with the in-vehicle electronic apparatus fixture brackets. Because this configuration allows the in-vehicle electronic apparatus to retreat, the dynamic load is alleviated or absorbed.

Indeed, the fixture structure for an in-vehicle electronic apparatus described in Japanese Patent Application Publication No. Hei. 9-48292 is designed for the center equipment placement section that has a relatively simple surface shape not swelling out toward the rear of the vehicle body; and is configured to allow a dynamic load to be directly inputted into the in-vehicle electronic apparatus. Thus, the fixture structure allows the in-vehicle electronic apparatus to retreat only by moving in parallel along the elongated holes. This design enables the fixture structure to cope even with a parallel movement of the in-vehicle electronic apparatus along the elongated holes. However, the fixture structure may not allow an in-vehicle electronic apparatus to retreat only by moving in parallel as described above, in a case where, for example, the center equipment placement section has a relatively complicated surface shape such as a surface shape swelling out toward the rear of the vehicle body to a large extent, and also is configured to allow a dynamic load to be indirectly inputted into the in-vehicle electronic apparatus through an article.

An object of the present invention is to provide a fixture structure for an in-vehicle electronic apparatus which allows an in-vehicle electronic apparatus to retreat in a desirable condition even when a center equipment placement section has a relatively complicated surface shape and is configured to allow an dynamic load to be indirectly inputted into the in-vehicle electronic apparatus due to the presence of an article in between.

SUMMARY OF THE INVENTION

For the purpose of fulfilling the above-described object, a fixture structure for an in-vehicle electronic apparatus according to an example of the present invention includes: an in-vehicle electronic apparatus fixture bracket through which an in-vehicle electronic apparatus is attached to a vehicle body. The in-vehicle electronic apparatus fixture bracket includes a retreat structure part allowing the in-vehicle electronic apparatus to retreat almost toward the front of the vehicle body when a dynamic load is inputted into the in-vehicle electronic apparatus. The retreat structure part includes: a hinge part allowing a lower portion of the in-vehicle electronic apparatus fixture bracket to rotate, together with the in-vehicle electronic apparatus, toward the front of the vehicle body about an upper portion of the in-vehicle electronic apparatus fixture bracket; and a rotational displacement accepting part allowing the lower portion of the in-vehicle electronic apparatus fixture bracket to be displaced due to its own rotation toward the front of the vehicle body.

In the case of the fixture structure for an in-vehicle electronic apparatus according to the example, the hinge part is a notched part formed in a front edge of an upper portion of the in-vehicle electronic apparatus fixture bracket.

In the case of the fixture structure for an in-vehicle electronic apparatus according to the example, the rotational displacement accepting part is a bend-destined part capable of bending in response to the rotation of the lower portion of the in-vehicle electronic apparatus fixture bracket toward the front of the vehicle body.

A receiving space capable of accepting the bend of the bend-destined part is set at a front side of the bend-destined part in the vehicle body.

DETAILED DESCRIPTION OF THE INVENTION

Figure 1:
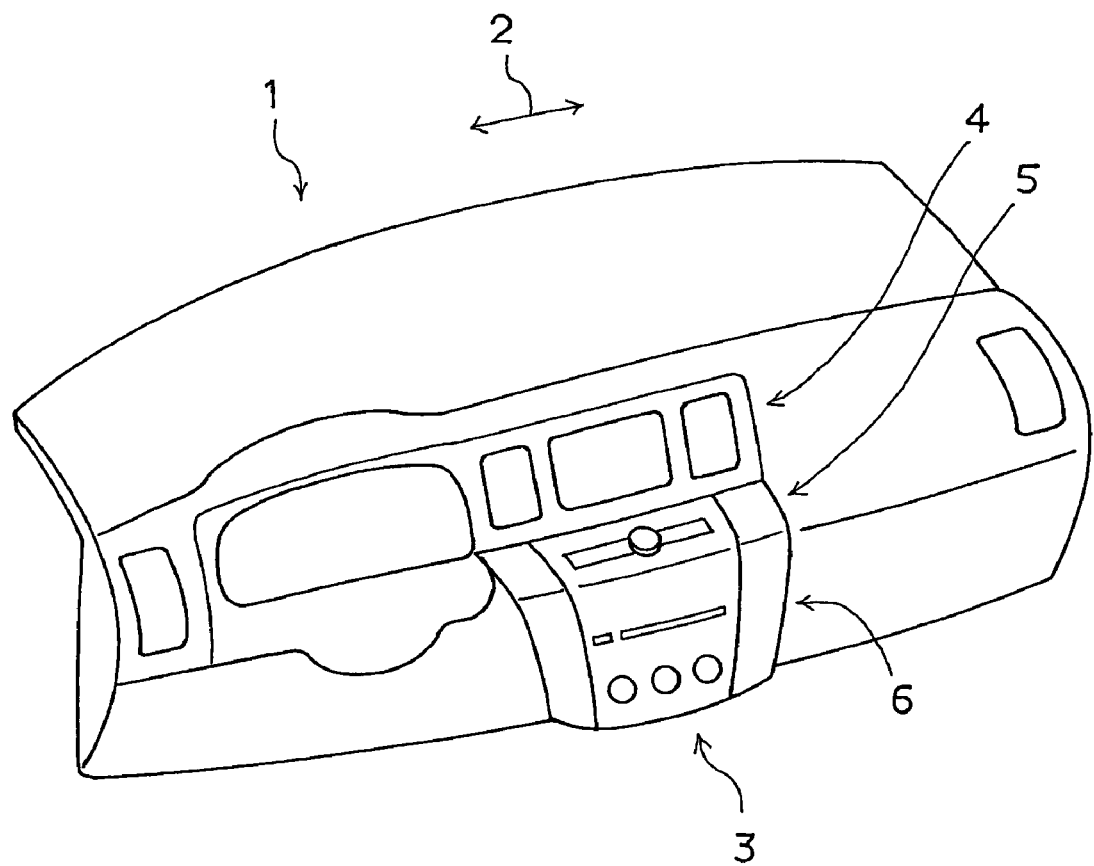
FIG. 1 is a perspective view showing how a fixture structure for an in-vehicle electronic apparatus according to an example of the present invention is attached to a vehicle instrument panel.

By referring to the drawings, detailed descriptions will be provided hereinafter for an embodiment in which a mode for carrying out the present invention is embodied.

Embodiment

FIGS. 1 to 12 illustrate an embodiment in which a fixture structure for an in-vehicle electronic apparatus according to the present is applied to a vehicle instrument panel.

As shown in FIG. 1, vehicles such as automobiles are each provided with an instrument panel 1 in a front portion of the vehicle compartment. This instrument panel 1 is provided with a center equipment placement section 3 and the like in its center portion in the vehicle width direction 2. This center equipment placement section 3 is almost continuously provided with a center ventilator part 4, a switch unit part 5 and an electronic equipment placement part 6 in order from top to bottom. In this case, the instrument panel 1 is shown as being that for a left-hand drive vehicle, but is not limited to this.

Figure 2:
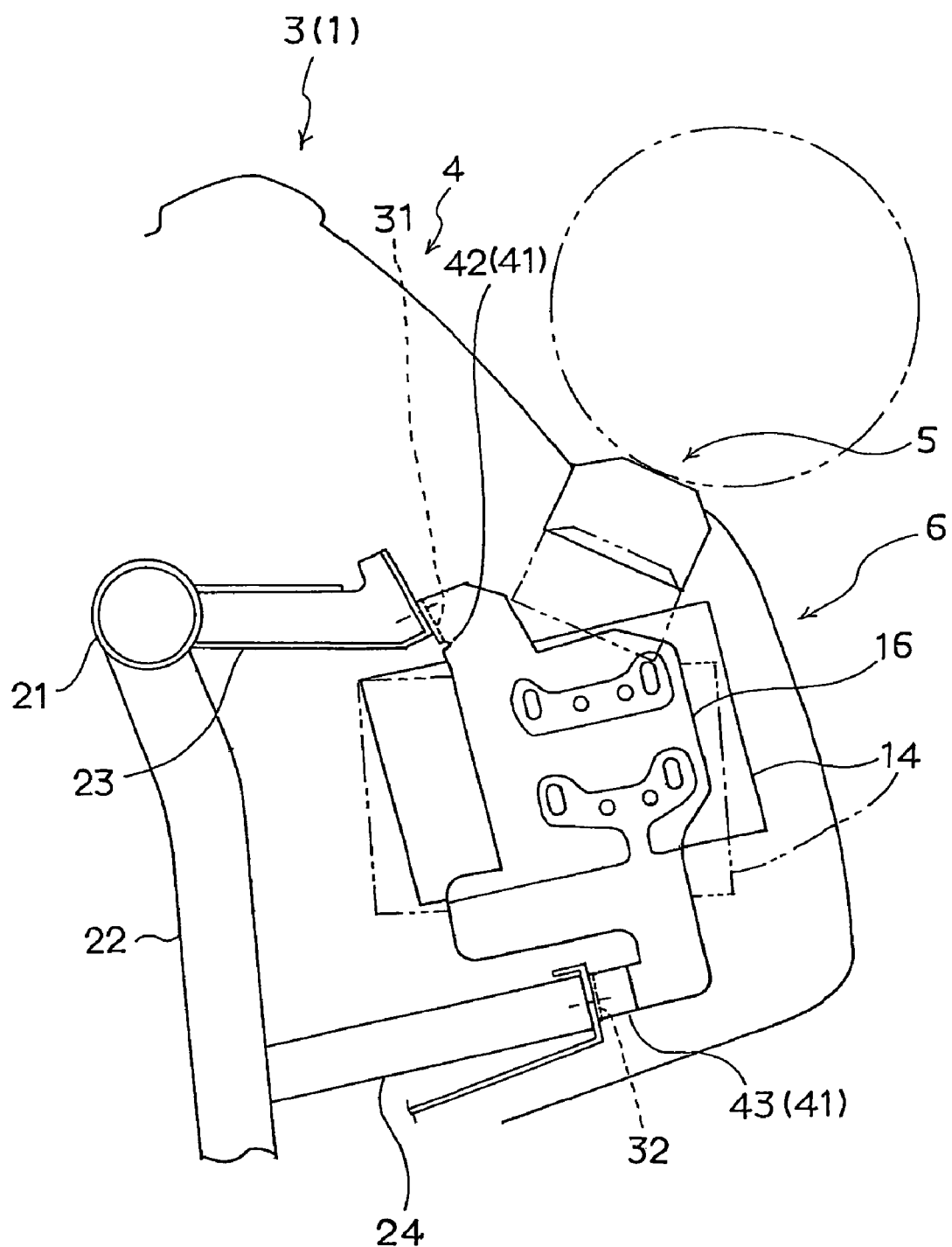
FIG. 2 is a cross-sectional side view of a center equipment placement section in the instrument panel shown in FIG. 1.

With regard to the surface of the center equipment placement section 3, as shown in FIG. 2, its middle portion in the vertical direction has such a relatively complicated shape (a stepped shape) as to swell out toward the rear of the vehicle body to a large extent. Specifically, the surface of the center ventilator part 4 located in an upper portion of the center equipment placement section 3 is a steep slope which is tilted to a vertical surface at an angle of approximately 40 degrees. On the other hand, the surface of the switch unit part 5 located in the middle portion of the center equipment placement section 3 is a gentle slope which is tilted to the vertical surface at an angle of approximately 60 degrees (which constitutes the rearward-swelling part). The surface of the electronic equipment placement part 6 located in the lower portion of the center equipment placement section 3 is a steep slope which is tilted to the vertical surface at an angle of approximately 20 degrees. This causes the side shape of the center equipment placement section 3 to have the stepped shape in which the portion corresponding to the switch unit part 5 largely swells out rearwardly.

Figure 3:
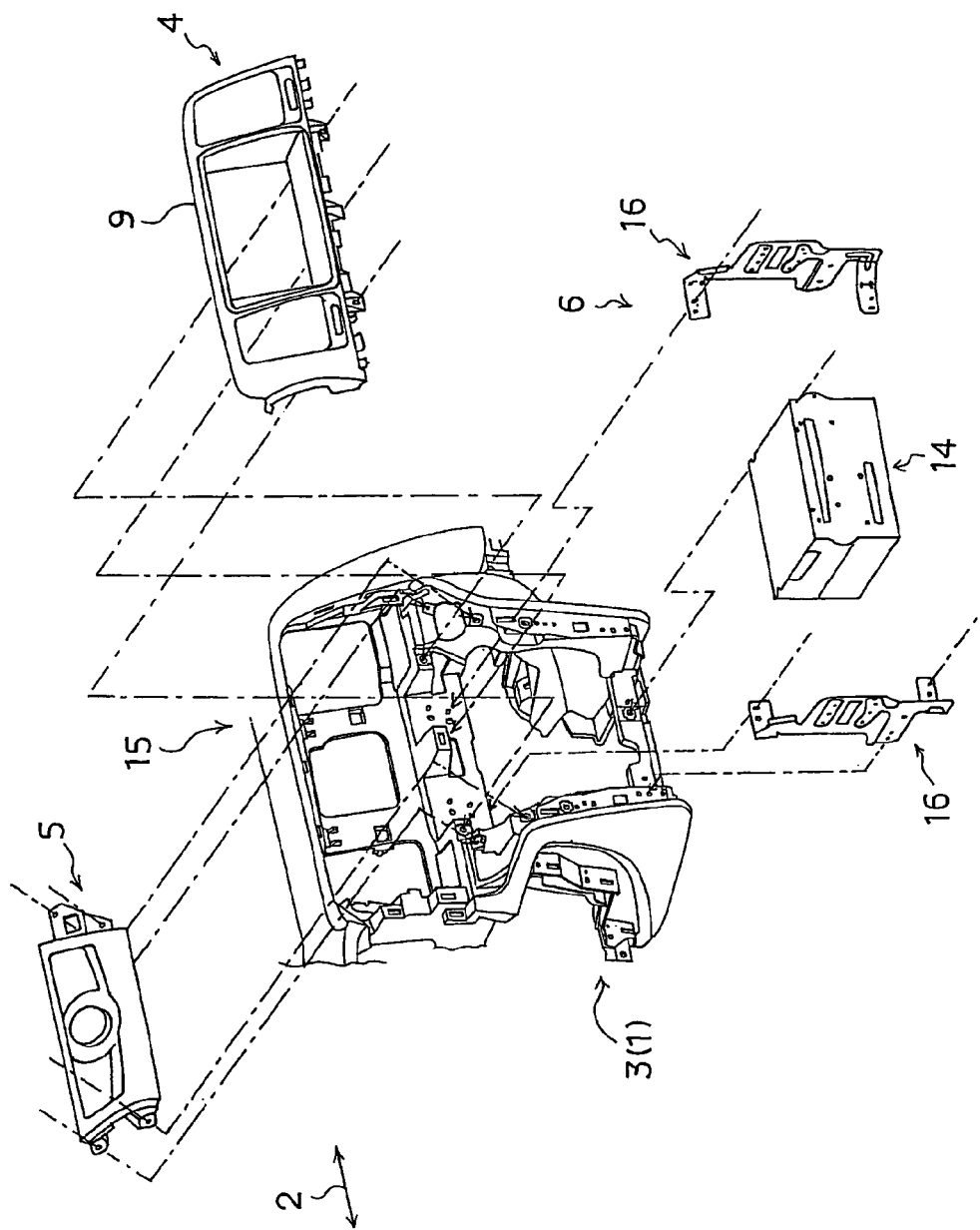
FIG. 3 is an exploded perspective view of FIG. 2.

As shown in FIG. 3, the center ventilator part 4 is configured of: right and left center ventilator grills; a liquid crystal display panel arranged between the right and left center ventilator grills; and a frame-shaped finisher member 9 which covers these components, and constitutes a surface design thereof. In addition, the switch unit part 5 is configured of an integral unit member in which various switches and equivalents are gathered together, and which allows the switches and equivalents to be operated collectively. Furthermore, the electronic equipment placement part 6 includes: a finisher member constituting the surface design thereof; and an in-vehicle electronic apparatus 14 such as an audio unit placed inside the electronic equipment placement part 6. The instrument panel 1 is provided with a fixture concave part 15 for the center equipment placement section.

The in-vehicle electronic apparatus 14 is a box-shape article with standardized dimensions. As shown in FIG. 2, the switch unit part 5 is placed above the in-vehicle electronic apparatus 14 of this kind. In this case, the switch unit part 5 is placed above a front portion of the upper surface of the in-vehicle electronic apparatus 14.

The in-vehicle electronic apparatus 14 of this kind is attached to the vehicle body with in-vehicle electronic apparatus fixture brackets 16 interposed in between as described below (see FIGS. 4 and 5). Incidentally, the in-vehicle electronic apparatus 14 may be placed in the vehicle body either in advance or after shipment. In other words, the in-vehicle electronic apparatus 14 is placed in the vehicle body in a detachably attachable manner.

More specifically, a vehicle body reinforcement member 21 extending almost in the vehicle width direction 2 is placed inside the instrument panel 1. This vehicle body reinforcement member 21 is a connecting reinforcement member for connecting the right and left vehicle body panels together, and is generally configured of a metal round pipe. This vehicle body reinforcement member 21 is termed as a "cross-car beam," a "steering support member," or the like. Stays 22 with which the floor panel supports the vehicle body reinforcement member 21 are provided in a center portion of the vehicle body reinforcement member 21 in the vehicle width direction 2. These stays 22 extend almost vertically downward from a lower portion of the vehicle body reinforcement member 21. Generally, the stays 22 are provided as paired right and left members with a predetermined interval in the vehicle width direction 2.

The vehicle body reinforcement member 21 is provided with upper-portion fixture brackets 23 with which upper portions of the in-vehicle electronic apparatus fixture brackets 16 are fixed to the vehicle body reinforcement member 21, respectively. Each upper-portion fixture bracket 23 extends from a corresponding rear portion of the vehicle body reinforcement member 21 almost horizontally toward the rear of the vehicle body. In addition, the stays 22 are provided with lower-portion fixture brackets 24 with which lower portions of the in-vehicle electronic apparatus fixture brackets 16 are fixed to the stays 22, respectively. Each lower-portion fixture bracket 24 extends almost horizontally toward the rear of the vehicle body from a rear portion of a middle portion, in its height direction, of the corresponding stay 22.

Figure 4:
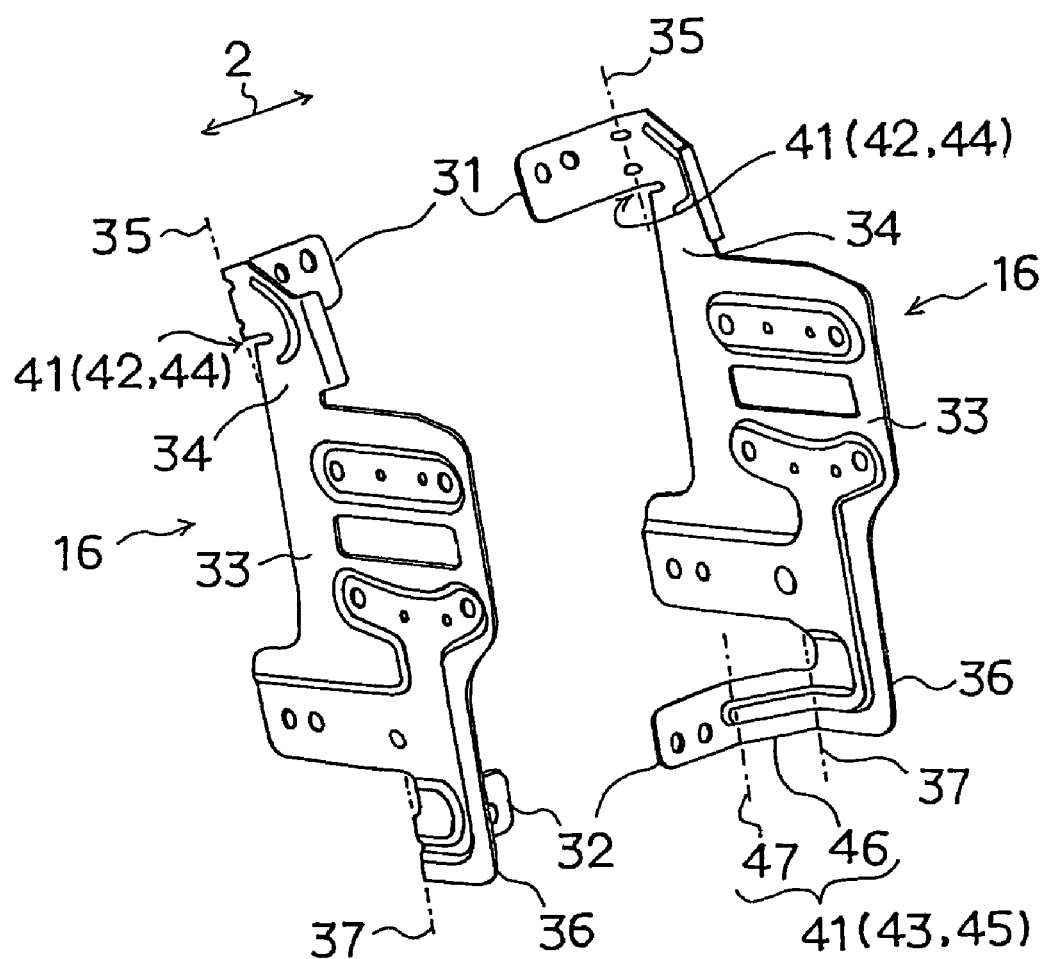
FIG. 4 is a perspective view of in-vehicle electronic apparatus fixture brackets.
Figure 5:
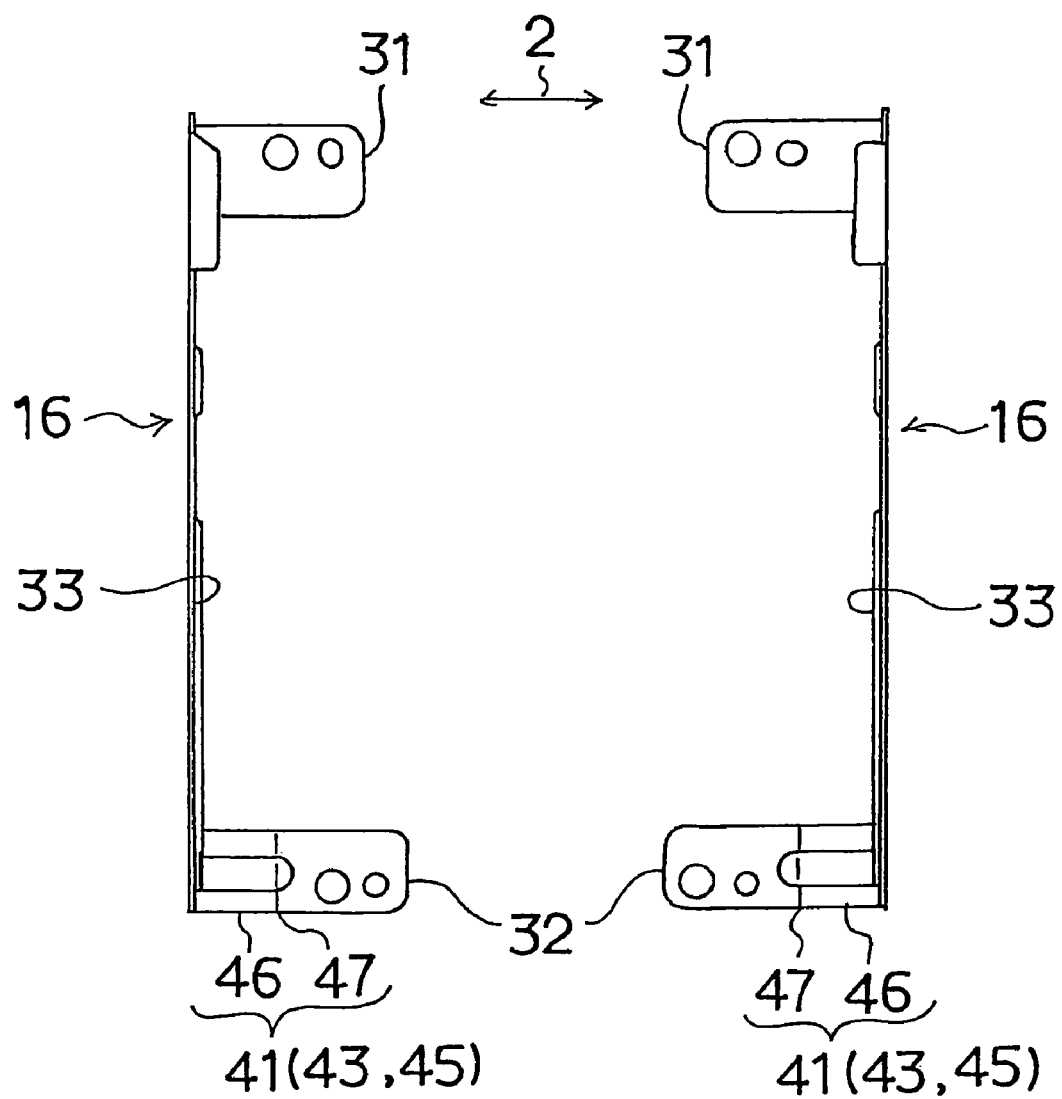
FIG. 5 is a view of the in-vehicle electronic apparatus fixture brackets which are viewed from the rear of the vehicle.

As shown in FIGS. 4 and 5, the in-vehicle electronic apparatus fixture brackets 16 are constituted of paired right and left press-molded metal plates. The paired right and left in-vehicle electronic apparatus fixture brackets 16 are faced perpendicularly to the vehicle width direction, and are arranged in parallel with each other with an interval almost equal to the width dimension of the in-vehicle electronic apparatus 14. A bead and/or a flange for reinforcement, a punched hole for weight reduction, and/or the like are provided in each in-vehicle electronic apparatus fixture bracket 16 as needed.

Each in-vehicle electronic apparatus fixture bracket 16 has, in its upper portion, an upper fixture part 31 to be connected to the vehicle body (the corresponding upper-portion fixture bracket 23 and the instrument panel 1), and has, in its lower portion, a lower fixture part 32 to be connected to the vehicle body (the corresponding lower-portion fixture bracket 24 and the instrument panel 1). In addition, each in-vehicle electronic apparatus fixture bracket 16 has, in its middle portion, a fixture surface part 33 to be connected to the in-vehicle electronic apparatus 14. The fixture surface part 33 is almost rectangular in shape. Screw holes and the like for fixing by screws the in-vehicle electronic apparatus fixture bracket 16 to the in-vehicle electronic apparatus 14, are formed in the fixture surface part 33 as needed.

In this case, an upward-extending part 34 extending almost vertically upward along a front edge portion of the corresponding fixture surface part 33 is integrally formed in an upper portion of the corresponding almost-rectangular fixture surface part 33. The upward-extending part 34 herein is formed in a protruding manner. The surface of this upward-extending part 34 is oriented in the same direction as the surface of the fixture surface part 33 is oriented. The upper fixture part 31 is integrally provided in the front edge portion in the upper end portion of this upward-extending part 34. The upper fixture part 31 includes an almost-tongue-shaped folded part 35 (slightly tilting forward) which extends almost in the vertical direction, and is bent inward in the vehicle width direction 2. In this upper fixture part 31, screw holes, locating holes and/or the like used for positioning and fixing are formed as needed.

In addition, a downward-extending part 36 extending almost vertically downward along its rear edge portion is integrally provided in a lower portion of the corresponding almost-rectangular fixture surface part 33 in a protruding manner. The surface of this downward-extending part 36 is faced in the same direction as the surface of the fixture surface part 33. The lower fixture part 32 is integrally provided in the end edge portion in the lower end portion of this downward-extending part 36. The almost-tongue-shaped lower fixture part 32 includes a folded part 37 (slightly tilting frontward) which extends almost vertically, and is bent inward in the vehicle width direction 2. In this lower fixture part 32, screw holes and/or locating holes used for positioning and fixing are formed as needed.

Each in-vehicle electronic apparatus fixture bracket 16 thus configured is provided with a retreat structure part 41 for allowing the in-vehicle electronic apparatus 14 to retreat toward the front of the vehicle body when a dynamic load is inputted into the in-vehicle electronic apparatus 14. Here, the input of a dynamic load means a certain magnitude of force which is applied to the in-vehicle electronic apparatus 14 toward the front of the vehicle body when the in-vehicle electronic apparatus 14 is attached to the in-vehicle electronic apparatus fixture brackets 16.

In addition to such basic configuration, a hinge part 42 is included in each retreat structure part 41 in this example. The hinge parts 42 allow the lower portions of the in-vehicle electronic apparatus fixture brackets 16 to rotate, together with the in-vehicle electronic apparatus 14, toward the front of the vehicle body about the upper portions of the in-vehicle electronic apparatus fixture brackets 16. This hinge part 42 is formed between the upper fixture part 31 and the fixture surface part 33.

Each retreat structure 41 further includes a rotational displacement accepting part 43 which allows the lower portion of the in-vehicle electronic apparatus fixture bracket 16 to be displaced due to its own rotation toward the front of the vehicle body. This rotational displacement accepting part 43 is formed between the lower fixture part 32 and the fixture surface part 33.

More specifically, each hinge part 42 is configured of a notched part 44 formed in the front edge upper portion of the in-vehicle electronic apparatus fixture bracket 16. In this case, the notched part 44 is formed in the upward-extending part 34. In other words, the notched part 44 is formed in the upward-extending part 34, that is, a location near a lower edge part of the upper fixture part 31.

Figure 6:
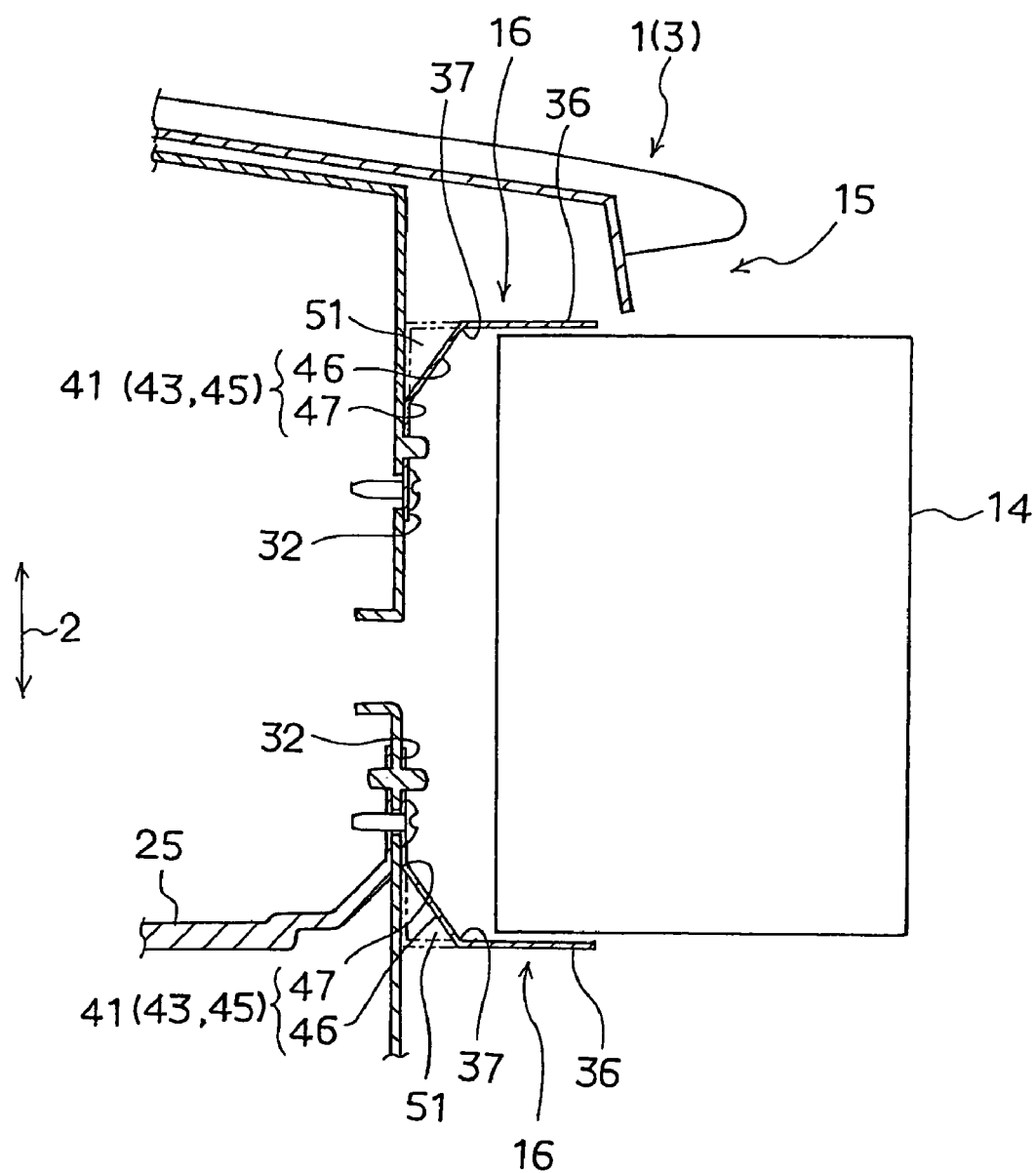
FIG. 6 is a horizontal cross-sectional view of rotational displacement accepting parts, one of which is included in FIG. 2.

In addition, each rotational displacement accepting part 43 is formed of a bend-destined part 45 capable of bending in response to the rotation of the lower portion of the corresponding in-vehicle electronic apparatus fixture bracket 16 toward the front of the vehicle body. The bend-destined part 45 herein includes an inclined part 46 and a folded part 47 which are formed between the lower fixture part 32 and the folded part 37. As shown in FIG. 6, the inclined part 46 is formed integrally in the lower fixture part 32 extending almost in the vehicle width direction 2 and the downward-extending part 36 extending almost in the vehicle front-rear direction, the inclined part 46 being formed in a way to extend inward as the inclined part 46 goes toward the front of the vehicle body. Moreover, the folded part 47 and the folded part 37 are oriented almost in parallel with each other (or oriented almost vertically although slightly tilting forward).

A receiving space 51 capable of accepting the bend of the bend-destined part 45 is set in front of the bend-destined part 45 in the vehicle front direction. In this case, as a triangular space, the receiving space 51 is secured between the recess surface of the fixture concave part 15 for the center equipment placement section of the instrument panel 1 and the inclined part 46. This receiving space 51 is formed in a triangle shape which is formed by using the inclined part 46 as the oblique line while using the extended line of the lower fixture part 32 and the extended line of the folded part 37 as the other two lines crossing almost orthogonal to each other. Note that the receiving space 51 may be formed in a triangle larger than this triangle.

Next, descriptions will be provided for effects of the fixture structure for the in-vehicle electronic apparatus with the foregoing configuration.

The in-vehicle electronic apparatus 14 is attached to the vehicle body with the in-vehicle electronic apparatus fixture brackets 16 interposed in between. Each in-vehicle electronic apparatus fixture bracket 16 is configured in a way that: the upper fixture part 31 includes the folded part 35 extending almost vertically; the upper fixture part 31 is bent inward almost in the vehicle width direction; the lower fixture part 32 includes the folded part 37 extending almost vertically; and the lower fixture 32 is bent inward almost in the vehicle width direction. Thereby, each in-vehicle electronic apparatus fixture bracket 16 has a structure which withstands vertical vibrations. In other words, excluding the horizontally-extending bent parts enables formation of the structure withstanding vertical vibration.

If, as shown in FIG. 2, the head of a passenger moves down and toward the front of the vehicle body and then abuts against the switch unit part 5 in an emergency situation, this abutment means indirectly inputs a dynamic load into the vehicle electronic apparatus 14.

In response to this indirect input of the dynamic load, each retreat structure part 41 causes the in-vehicle electronic apparatus 14 to retreat toward the front of the vehicle body by operating as follows.

Figure 7:
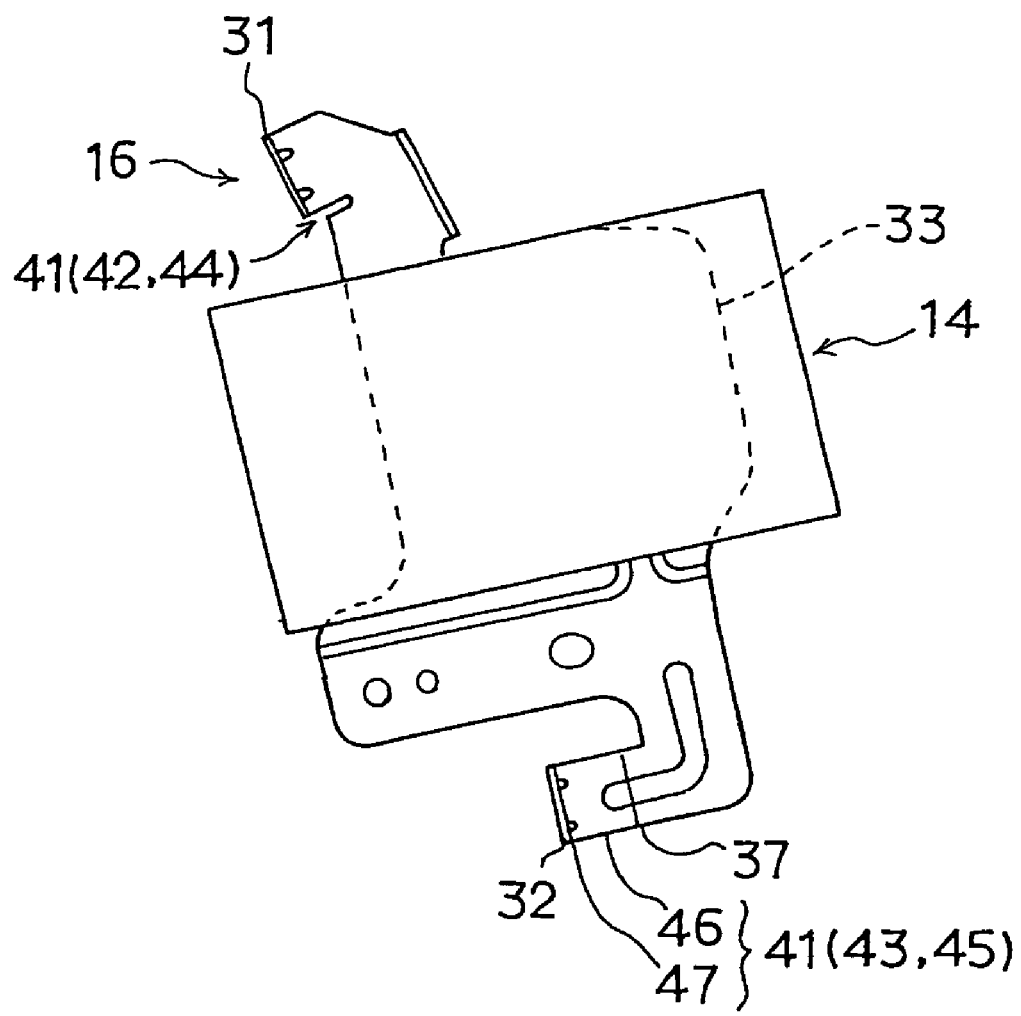
FIG. 7 is a side view showing how a retreat structure part included in the fixture structure for an in-vehicle electronic apparatus shown in FIG. 1 operates.
Figure 8:
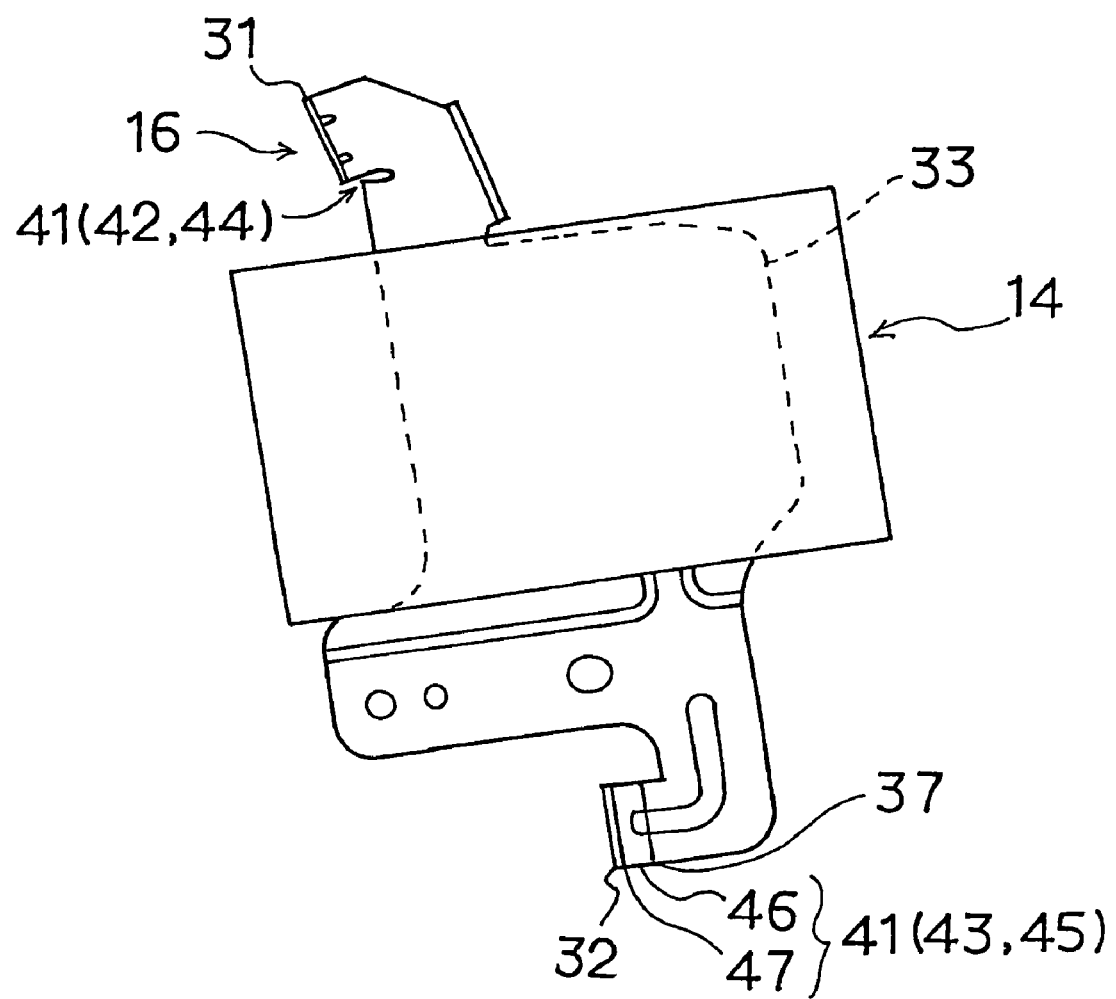
FIG. 8 is an operational view of how the retreat structure part shown in FIG. 7 operates.
Figure 9:
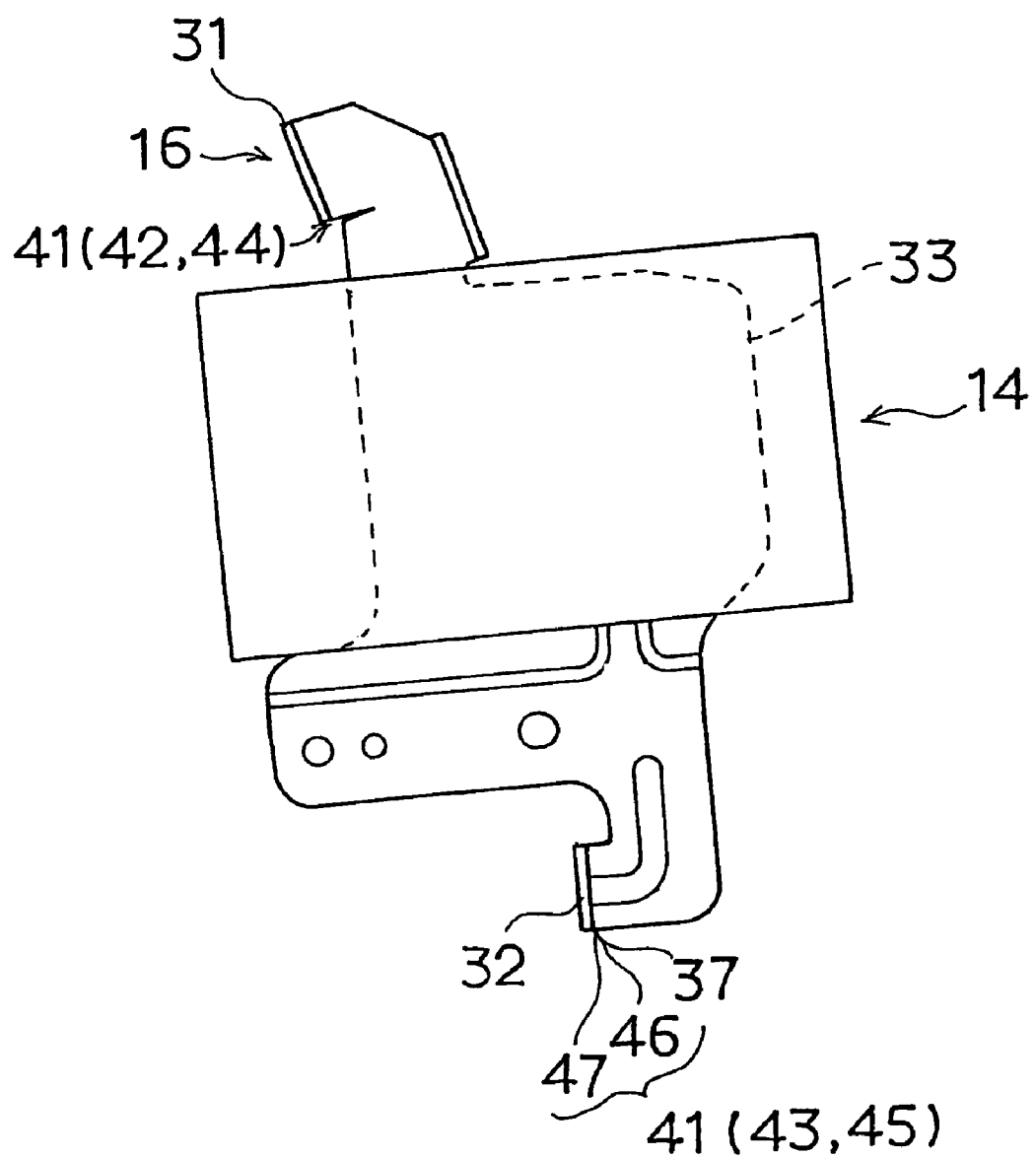
FIG. 9 is an operational view of the retreat structure part shown in FIG. 8.
Figure 10:
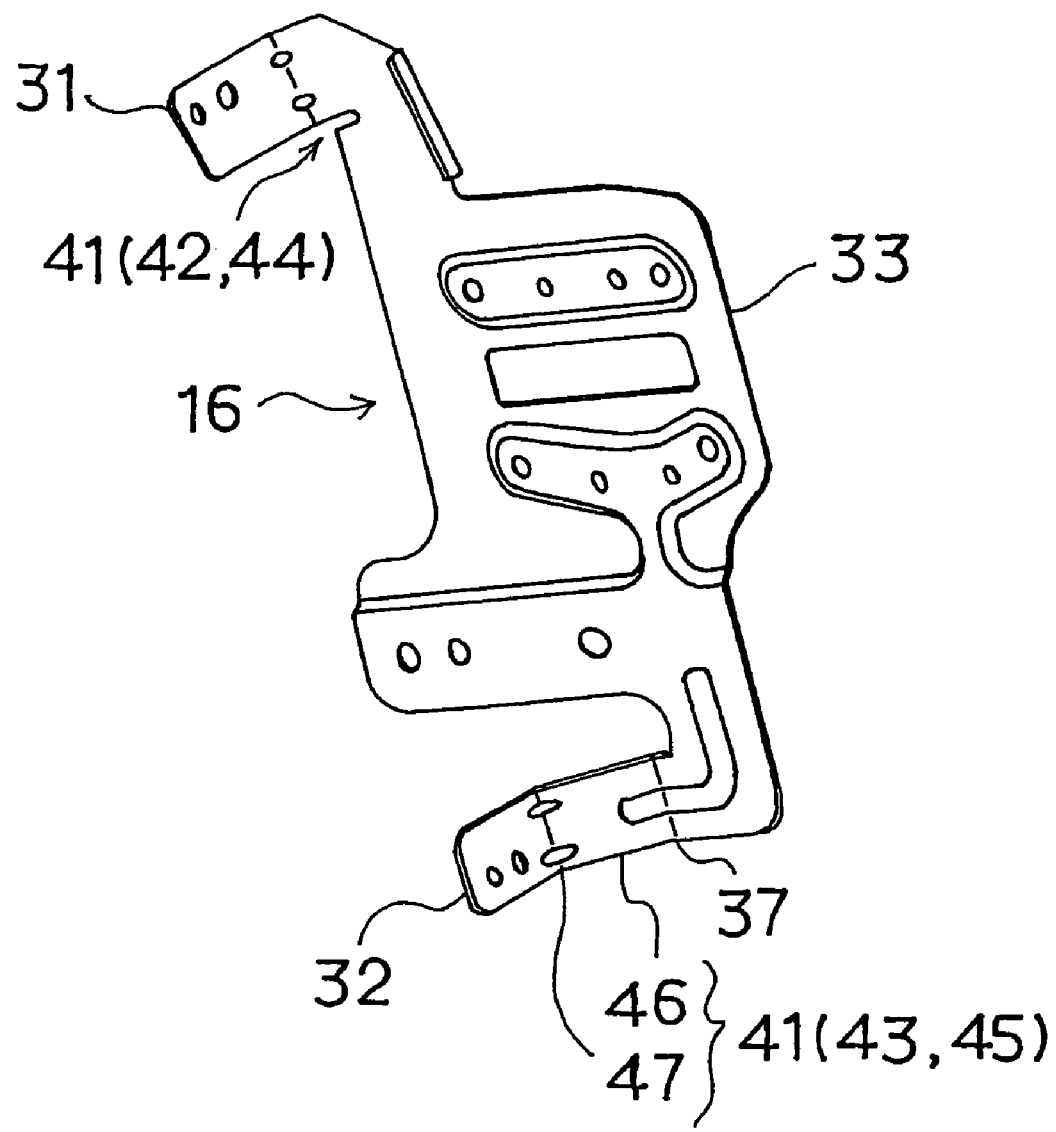
FIG. 10 is a perspective view showing how the retreat structure part operates.
Figure 11:
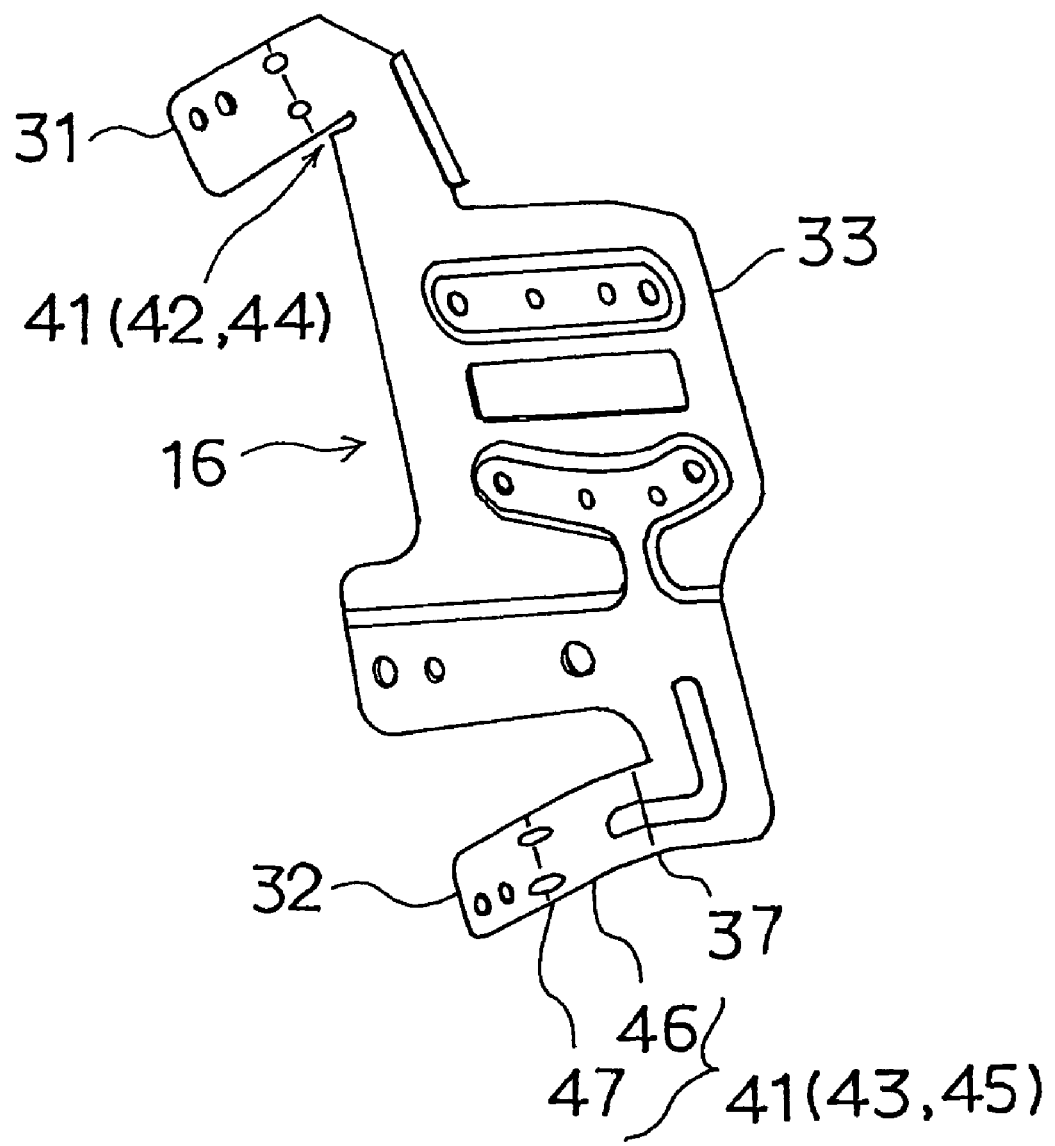
FIG. 11 is an operational view of the retreat structure part, which is similar to that shown in FIG. 10.
Figure 12:
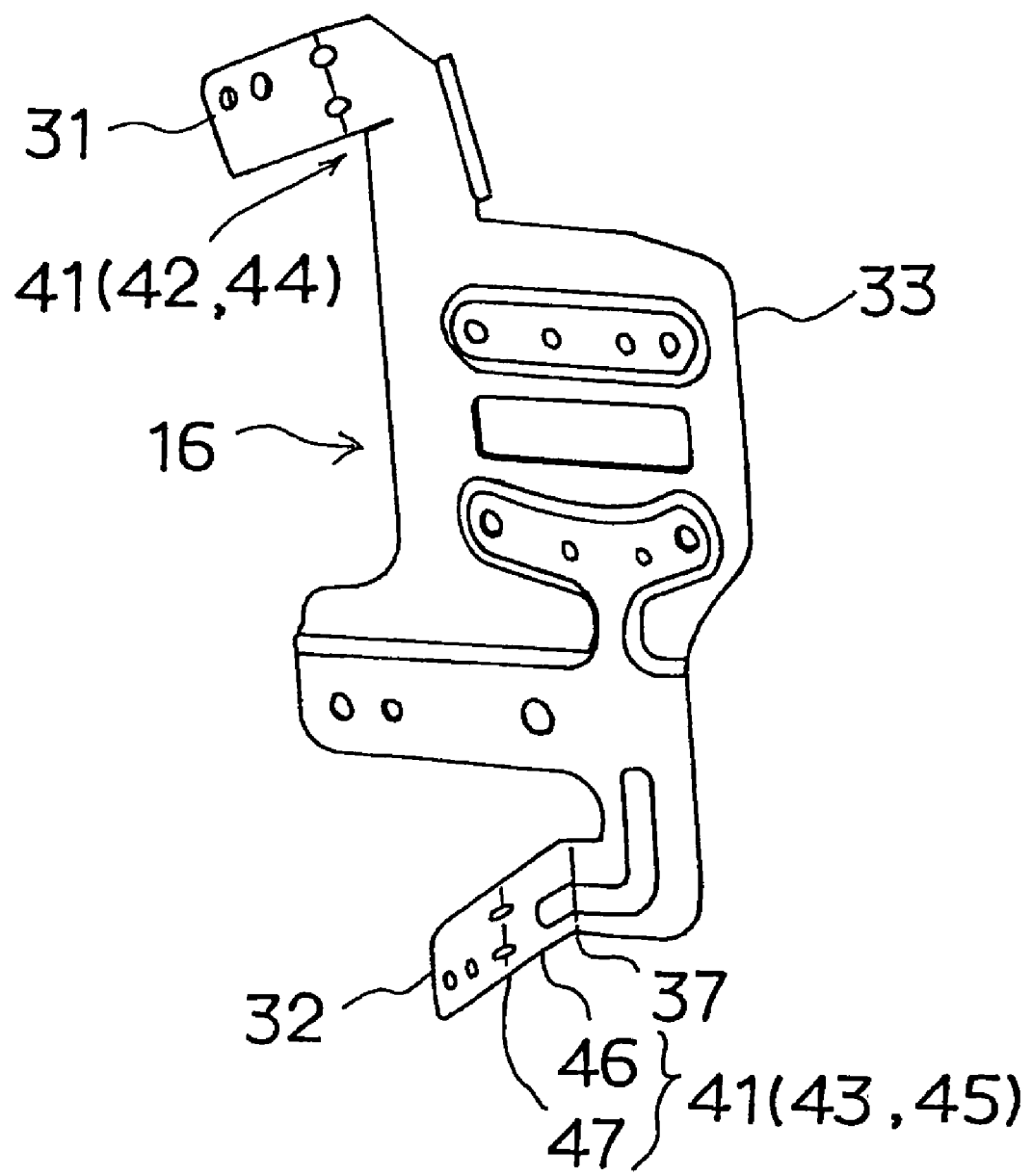
FIG. 12 is an operational view similar to that shown in FIG. 11.

Specifically, as sequentially shown in FIGS. 7 to 9 (side views) and FIGS. 10 to 12 (perspective views), the hinge part 42 allows the lower portion of the in-vehicle electronic apparatus fixture bracket 16 to rotate together with the in-vehicle electronic apparatus 14 attached thereto, toward the front of the vehicle body about the upper portion of the in-vehicle electronic apparatus fixture bracket 16.

The bend-destined part 45 constituting the rotational displacement accepting part 43 allows the lower portion of the in-vehicle electronic apparatus fixture bracket 16 to be displaced due to its own rotation toward the front of the vehicle body.

In addition, the receiving space 51 set in the location in front of the bend-destined part 45 toward the front of the vehicle body accepts the bend of the bend-destined part 45.

At this time, the retreat structure 41 can cause the fixture surface part 33 and the in-vehicle electronic apparatus 14 to displace without influencing the locations of the upper fixture part 31 and the lower fixture part 32.

In the fixture structure for an in-vehicle electronic apparatus according to this example, it is designed that: the in-vehicle electronic apparatus 14 is attached to the vehicle body with the in-vehicle electronic apparatus fixture brackets 16 interposed in between; and each in-vehicle electronic apparatus fixture bracket 16 includes the retreat structure part 41 which allows the in-vehicle electronic apparatus 14 to retreat toward the front of the vehicle body in response to an input of a dynamic load. Further, the fixture structure for an in-vehicle electronic apparatus of this example includes the retreat structure part 41 constituted of the hinge part 42 which allows the lower portion of the in-vehicle electronic apparatus fixture bracket 16 to rotate together with the in-vehicle electronic apparatus 14 attached thereto, toward the front of the vehicle body about the upper portion of the in-vehicle electronic apparatus fixture bracket 16; and the rotational displacement accepting part 43 allowing the lower portion of the in-vehicle electronic apparatus fixture bracket 16 to be displaced due to its own rotation toward the front of the vehicle body. Thereby, the following advantageous effects can be obtained.

Specifically, when a dynamic load is inputted, the structure causes the in-vehicle electronic apparatus 14 and the in-vehicle electronic apparatus fixture brackets 16 to retreat together by means of the rotational displacement about the hinge part 42. This allows the dynamic load to be absorbed. Additionally, the above-described structure is capable of reducing damage to be caused on the in-vehicle electronic apparatus 14, and securing a relatively large retreat stroke for the in-vehicle electronic apparatus 14. This brings about a structural advantage.

At this time, the above-described rotational displacement can be desirably performed. That is because the rotational displacement accepting part 43 allows the lower portion of the in-vehicle electronic apparatus fixture bracket 16 to be displaced due to its own rotation toward the front of the vehicle body.

Even when the surface shape of the instrument panel in the vicinity of the in-vehicle electronic apparatus 14 is relatively complicated, and also when a dynamic load is indirectly inputted into the in-vehicle electronic apparatus 14 with an article being interposed in between, the rotational displacement about the hinge part 42 can allow the in-vehicle electronic apparatus 14 to retreat in a desirable manner without having an extremely strict relationship between the inputting direction of the dynamic load and the retreating direction of the in-vehicle electronic apparatus 14.

The hinge parts 42 can be easily formed because the hinge parts 42 are the notched parts 44 formed in the front edge upper portions of the in-vehicle electronic apparatus fixture brackets 16, respectively. In addition, the dynamic load can be absorbed because appropriate reception counterforce is produced when in-vehicle electronic apparatus fixture brackets 16 deform in the respective notched parts 44.

Since the rotational displacement accepting part 43 is the bend-destined part 45 capable of bending in response to the rotation of the lower portion of the in-vehicle electronic apparatus fixture bracket 16 toward the front of the vehicle body, bending of the bend-destined part 45 makes it possible to easily allow the lower portion of the in-vehicle electronic apparatus fixture bracket 16 to be displaced due to its own rotation toward the front of the vehicle body. Furthermore, the dynamic load can be absorbed because appropriate reception counterforce is produced when the bend-destined parts 45 are bent.

The bend-destined part 45 can be securely bent because the receiving space 51 capable of accepting the bend of the bend-destined part 45 is set in a location in front of the bend-destined part 45 toward the front of the vehicle body so that no obstruction of the bend is present toward the front of the vehicle body.

According to the present invention, the in-vehicle electronic apparatus is attached to the vehicle body with the in-vehicle electronic apparatus fixture brackets interposed in between. Each in-vehicle electronic apparatus fixture bracket includes the retreat structure part which allows the in-vehicle electronic apparatus to retreat almost horizontally toward the front of the vehicle body when the dynamic load is inputted into the in-vehicle electronic apparatus. The retreat structure part includes the hinge part which allows the lower portion of the in-vehicle electronic apparatus fixture bracket to rotate together with the in-vehicle electronic apparatus attached thereto, toward the front of the vehicle body about the upper portion of the in-vehicle electronic apparatus fixture bracket, and the retreat structure part also includes the rotational displacement accepting part allowing the lower portion of the in-vehicle electronic apparatus fixture bracket 16 to be displaced due to its own rotation toward the front of the vehicle body.

Specifically, when a dynamic load is inputted, the structure causes the in-vehicle electronic apparatus 14 and the in-vehicle electronic apparatus fixture brackets 16 to retreat together by means of the rotational displacement about the hinge part. This allows the dynamic load to be absorbed. Additionally, the above-described structure is capable of securing a relatively large retreat stroke for the in-vehicle electronic apparatus. This brings about a structural advantage. At this time, the above-described rotational displacement can be desirably performed. That is because the rotational displacement accepting part allows the lower portion of the in-vehicle electronic apparatus fixture bracket to be displaced due to its own rotation toward the front of the vehicle body. In addition, even when the surface shape of the instrument panel in the vicinity of the in-vehicle electronic apparatus is relatively complicated, and also when a dynamic load is indirectly inputted into the in-vehicle electronic apparatus with an article being interposed in between, the rotational displacement about the hinge part can allow the in-vehicle electronic apparatus to retreat in a desirable manner without having an extremely strict relationship between the inputting direction of the dynamic load and the retreating direction of the in-vehicle electronic apparatus.

Additionally, the hinge parts can be easily formed because the hinge parts are the notched parts formed in the front edge upper portions of the in-vehicle electronic apparatus fixture brackets, respectively. In addition, the dynamic load can be absorbed because appropriate reception counterforce is produced when in-vehicle electronic apparatus fixture brackets deform in the respective notched parts.

Moreover, since the rotational displacement accepting part is the bend-destined part capable of bending in response to the rotation of the lower portion of the in-vehicle electronic apparatus fixture bracket toward the front of the vehicle body, bending of the bend-destined part makes it possible to easily accept the displacement of the in-vehicle electronic apparatus fixture bracket 16 which is caused by the rotation of the same toward the front of the vehicle body. Furthermore, the dynamic load can be absorbed because appropriate reception counterforce is produced when the bend-destined parts are bent.

Furthermore, the bend-destined part can be securely bent because the receiving space capable of accepting the bend of the bend-destined part is set in a location in front of the bend-destined part toward the front of the vehicle body so that no obstruction of the bend is present toward the front of the vehicle body.

The foregoing descriptions have been provided for the preferable example of the present invention. However, the present invention is not limited to this example. It should be noted that this example can be changed and modified variously.

For instance, the present invention is applicable to a case where the dynamic load is directly inputted into the in-vehicle electronic apparatus, in addition to where the dynamic load is indirectly inputted into the in-vehicle electronic apparatus with an article interposed in between.

What is claimed is:

1. A fixture structure for an in-vehicle electronic apparatus comprising:
    an in-vehicle electronic apparatus fixture bracket through which an in-vehicle electronic apparatus is attached to a vehicle body, the in-vehicle electronic apparatus fixture bracket including a retreat structure part allowing the in-vehicle electronic apparatus to retreat toward a front of the vehicle body when a dynamic load is inputted into the in-vehicle electronic apparatus,
    the retreat structure part including:
        a hinge part allowing a lower portion of the in-vehicle electronic apparatus fixture bracket to rotate, together with the in-vehicle electronic apparatus, toward the front of the vehicle body about an upper portion of the in-vehicle electronic apparatus fixture bracket, and
        a rotational displacement accepting part allowing the lower portion of the in-vehicle electronic apparatus fixture bracket to be displaced due to its own rotation toward the front of the vehicle body.

2. The fixture structure for an in-vehicle electronic apparatus according to claim 1, wherein the hinge part is a notched part formed in a front edge of an upper portion of the in-vehicle electronic apparatus fixture bracket.

3. The fixture structure for an in-vehicle electronic apparatus according to claim 2, wherein the rotational displacement accepting part is a bend-destined part capable of bending in response to the rotation of the lower portion of the in-vehicle electronic apparatus fixture bracket toward the front of the vehicle body.

4. The fixture structure for an in-vehicle electronic apparatus according to claim 1, wherein the rotational displacement accepting part is a bend-destined part capable of bending in response to the rotation of the lower portion of the in-vehicle electronic apparatus fixture bracket toward the front of the vehicle body.

5. The fixture structure for an in-vehicle electronic apparatus according to claim 4, wherein a receiving space capable of accepting the bend of the bend-destined part is set at a front side of the bend-destined part in the vehicle body.

* * * * *